April 23, 1929.  H. A. NICHOLSON  1,710,236
VEHICLE SPRING MECHANISM
Filed March 29, 1923

INVENTOR.
HENRY A. NICHOLSON.
BY A. B. Bowman
ATTORNEY

Patented Apr. 23, 1929.

1,710,236

UNITED STATES PATENT OFFICE.

HENRY A. NICHOLSON, OF LA MESA, CALIFORNIA.

VEHICLE SPRING MECHANISM.

Application filed March 29, 1923. Serial No. 628,461.

My invention relates to vehicle springs and the objects of this invention are: first, to provide a vehicle spring mechanism in which the vehicle spring is so positioned and supported by the vehicle frame and so constructed that the rebound or shock caused by the depressions, obstructions or other irregularities in the roadway is directed in a direction opposite to the direction or motion of the vehicle and the force of gravity, and is therefore taken up by the momentum of the forward moving vehicle as well as by its weight; second, to provide a vehicle spring mechanism of this class in which the vehicle axle is resiliently supported by the vehicle frame and yieldable substantially in the direction of the component of the direction of the momentum of the vehicle and the force of gravity due to its weight; third, to provide a vehicle spring mechanism in which the vehicle axle is supported on a leaf spring intermediate its ends and in which the ends of the leaf springs are pivotally connected to yieldable telescopic members, positioned substantially at the angle of the component of forces of the momentum of the vehicle and the force of its weight due to gravity; fourth, to provide a novelly constructed vehicle spring mechanism of this class, and fifth, to provide a vehicle spring mechanism of this class which is very simple and economical of construction, durable, efficient, practical, and which will not readily deteriorate or get out of order.

Figure 1:
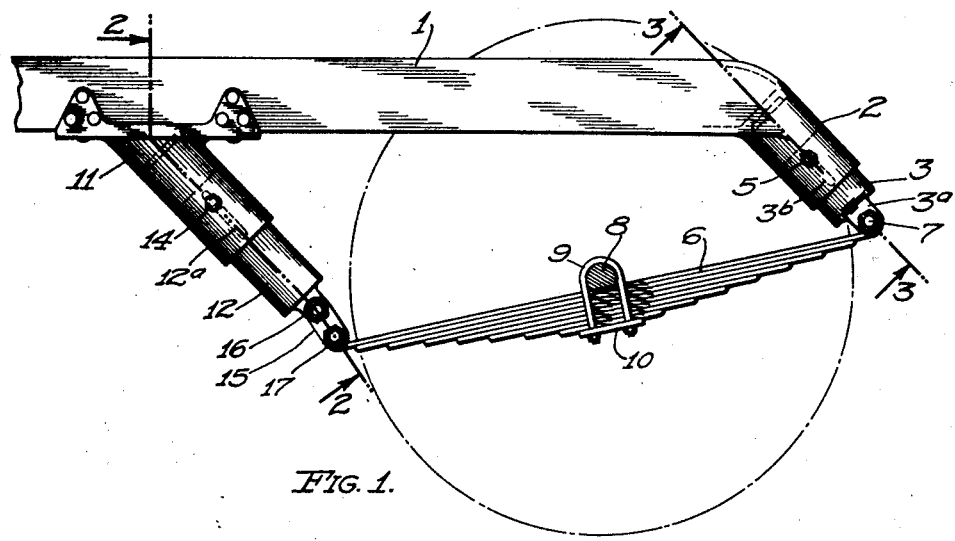
Figures 2, 3:
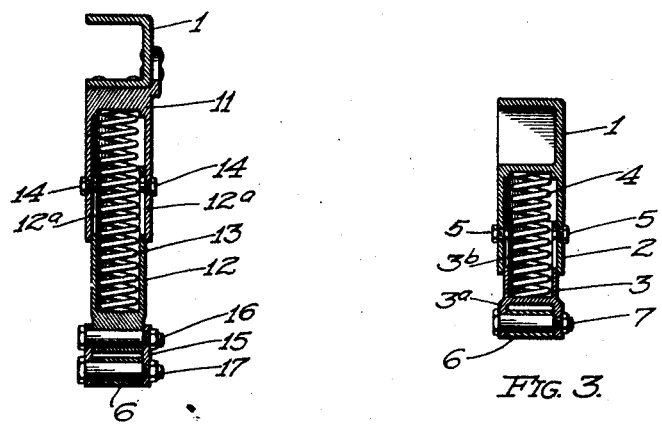

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of my vehicle spring mechanism secured to the vehicle frame shown fragmentarily and secured to the axle of the vehicle; Fig. 2 is a sectional view thereof taken through 2—2 of Fig. 1, and Fig. 3 is another sectional view of the front portions thereof, taken through 3—3 of Fig. 1.

Like characters of reference refer to similar parts and portions throughout the several views of the drawings.

The vehicle frame 1, guide member 2, spring supporting member 3, spring 4, stop screws 5, leaf spring 6, bolt 7, vehicle axle 8, U-bolt 9, plate 10, bracket guide member 11, spring supporting member 12, spring 13, stop screws 14, links 15, and the bolts 16 and 17, constitute the principal parts and portions of my vehicle spring mechanism.

When using my spring mechanism in connection with the front axle of the vehicle there is provided at the front end of the side members of the frame 1, downwardly inclined guide members 2, preferably integrally secured to the frame side members. These guide members 2 are cylindrical in form and in the same are reciprocally mounted the cylindrical casing, spring supporting members 3 at the outer ends of which are provided lugs 3$^a$ on which is pivotally mounted the one end of the leaf spring 6 by means of the bolt 7. In the inside of the members 2 and 3 is positioned the compression spring 4, tending to force the member 3 outwardly. To limit the inward and outward movement of the members relatively to each other, I have provided stop screws 5, positioned opposite each other in the member 2, the inner ends of which screws engage the slotted portion 3$^b$ of the member 3, and also serve to prevent rotary motion of the members 2 and 3 relatively to each other. The leaf spring 6 is positioned at an angle with the horizontal, its front end being higher than its rear end, and is secured intermediate its ends to the vehicle axle 8 by means of the U-bolts 9 extending around said axle and through a plate 10 positioned at the under side of the spring 6. The rear end of the leaf spring 6 is similarly supported by the vehicle frame but is also laterally shiftable therewith. The spring supporting means supporting the rear end of the leaf spring 6 consists of the bracket guide member 11, secured to the vehicle frame, having a downwardly and forwardly extending, cylindrical recess portion in which is reciprocally or telescopically mounted the spring supporting member 12, which is connected at its outer, lower end to the rear end of the leaf spring 6 by means of the links 15, pivotally connected respectively to the member 12 and spring 6 by means of the bolts 16 and 17. In the cylindrical, recess portion of the members 11 and 12 is positioned a compression coil spring 13, tending to force the member 12 outwardly from the member 11. I have provided stop screws 14 positioned opposite each other in the wall of the member 11, the inner ends of which screws engage the slotted portions 12ᵃ at the inner end of the wall of the member 12, which screws limit the inward and outward movement of the members 11 and 12 respectively to each other.

The stop screws in connection with the guide and spring supporting means at the front and rear of the leaf springs are particularly adapted to prevent the members 3 and 12 from leaving their sockets when raising the frame of the vehicle.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

It is obvious from this construction that there is provided a vehicle spring mechanism in which the vehicle spring is so positioned relatively to and supported by the vehicle frame and so constructed, that the rebound or shock caused by irregularities in the roadway is directed in a direction opposite to the direction of movement of the vehicle and the force of gravity, and is therefore taken up by the spring mechanism which acts against the momentum of the moving vehicle as well as its weight; that there is provided a vehicle spring mechanism in which the vehicle axle is resiliently supported by the vehicle frame and yieldable substantially in the direction of the component of the momentum of the vehicle and the force of gravity due to its weight; that there is provided a spring mechanism of this class in which the vehicle axle is supported on a leaf spring intermediate its ends and in which the ends of the leaf spring are pivotally connected to yieldably separable telescopic members positioned substantially at the angle of the component of forces of the momentum of the vehicle and the force of its weight due to gravity; that there is provided a novelly constructed and supported vehicle spring mechanism of this class, and that there is provided a vehicle spring mechanism which is very simple and economical of construction, durable, efficient, practical, and which will not readily deteriorate or get out of order.

Having thus described my invention, what I claim as new and desire to secure by Letters Patent, is:

1. A vehicle spring mechanism, including a spring member secured to the vehicle axle, a guide means rigidly secured to the vehicle frame and extending downwardly and forwardly at an angle from the perpendicular, and a reciprocating member telescopically and yieldably mounted in said guide member and extending from the extended end thereof and pivotally connected to the forward end of said spring member.

2. A vehicle spring mechanism, including a spring member secured to the vehicle axle, a guide means rigidly secured to the vehicle frame and extending downwardly and forwardly at an angle from the perpendicular, a reciprocating member telescopically and yieldably mounted in said guide member and extending from the extended end thereof and connected to the forward end of the spring, and link means pivotally connected to the other end of said spring member for pivotally supporting the same relative to said frame.

3. A vehicle spring mechanism, including a spring member secured intermediate its ends to the vehicle axle, spaced apart guide members secured to the vehicle frame, extending downwardly and forwardly at an angle therefrom, spring supporting members reciprocally mounted in said guide members and extending outwardly from the lower extended end thereof, pivotally connected at their outwardly extending ends with said spring member, compression springs positioned in said guide and spring supporting members, and stop means in connection with said guide and spring supporting members, limiting the movement of said members relatively to each other.

4. A vehicle spring mechanism, including an angularly positioned leaf spring, its front end being higher than its rear end, spaced apart guide members secured to the vehicle frame, extending downwardly and at an angle therefrom, spring supporting members reciprocally mounted in said guide members and extending outwardly from the lower extended end thereof, pivotally connected at their outwardly extending ends with said spring member, and compression springs positioned in said guide and spring supporting members.

5. In a vehicle spring mechanism, an angularly positioned leaf spring, its forward end being higher than its rear end, spaced apart guide members secured to the vehicle frame and extending downwardly and forwardly at an angle therefrom, and spring supporting members reciprocally and yieldably mounted on and relative to said guide members and extending beyond the ends thereof, the outer ends of said spring supporting members being pivotally connected at their extended ends with said spring member.

In testimony whereof, I have hereunto set my hand at San Diego, California, this 23d day of March, 1923.

HENRY A. NICHOLSON.